United States Patent [19]

Clements et al.

[11] 4,069,903

[45] Jan. 24, 1978

[54] SYNCHRONOUS SELF-SHIFTING TOOTHED CLUTCH

[75] Inventors: Herbert Arthur Clements, Weybridge; Robert Howard Heybourne, East Molesey, both of England

[73] Assignee: S.S.S. Patents Limited, London, England

[21] Appl. No.: 620,587

[22] Filed: Oct. 8, 1975

[30] Foreign Application Priority Data

Oct. 11, 1974 United Kingdom ............... 44276/74

[51] Int. Cl.² ........................................... F16D 23/02
[52] U.S. Cl. ................................................. 192/67 A
[58] Field of Search ................. 192/67 A, 67 R, 108, 192/109 D, 114 R, 114 T, 53.6, 53 H

[56] References Cited

U.S. PATENT DOCUMENTS

| 1,009,990 | 11/1911 | Norton | 192/67 R |
|---|---|---|---|
| 1,515,100 | 11/1924 | Foster | 192/108 |
| 1,913,046 | 6/1933 | Callan | 192/108 X |
| 1,977,204 | 10/1934 | Peterson | 192/108 X |
| 3,203,526 | 8/1965 | Clements | 192/67 A |
| 3,272,295 | 9/1966 | Clements | 192/67 A |
| 3,326,056 | 6/1967 | Clements et al. | 192/67 A X |
| 3,715,019 | 2/1973 | Heybourne et al. | 192/114 R X |

FOREIGN PATENT DOCUMENTS

| 1,020,695 | 2/1953 | France | 192/108 |
|---|---|---|---|
| 857,162 | 11/1952 | Germany | 192/67 A |
| 82,113 | 11/1918 | Switzerland | 192/108 |

Primary Examiner—Allan D. Herrmann
Assistant Examiner—Carl F. Pietruszka
Attorney, Agent, or Firm—Woodcock, Washburn, Kurtz & Mackiewicz

[57] ABSTRACT

A synchronous self-shifting toothed clutch, for use between a gas turbine and an electrical generator, of the type comprising an intermediate member which moves helically relative to a rotary clutch part in the direction to interengage the coacting clutch teeth upon passage of the rotary clutch parts through synchronism in one direction of relative rotation, and wherein a dashpot is provided for cushioning the final phase of clutch engagement.

The improvement comprises a first ring of locking dogs carried by the said rotary clutch part, and a second ring of locking dogs carried by a control sleeve mounted for axial movement relative to the intermediate member. The dogs of the first ring are alternately short and long, the short dogs being narrower than the long dogs, and the dogs of the second ring are alternately short and long, the short dogs being wider than the long dogs. In each ring, the long dogs project axially beyond the short dogs towards the other ring, and the spaces between the dogs are alternately wide and narrow.

With the clutch teeth partially engaged the long dogs of each ring can interengage with the long dogs of the other ring, but the short dogs of the second ring are baulked axially by the long dogs of the first ring. With the clutch teeth fully interengaged the dogs of each ring can interengage with the dogs of the other ring.

3 Claims, 9 Drawing Figures

SYNCHRONOUS SELF-SHIFTING TOOTHED CLUTCH

This invention relates to a synchronous self-shifting toothed clutch of the type comprising first and second rotary clutch parts and mechanism operative, upon passage of the first and second rotary clutch parts through synchronism in one direction of relative rotation, to initiate interengagement of the coacting clutch teeth, the said mechanism including an intermediate member of clutch sleeve which is constrained for helical movement relative to one of the rotary clutch parts, conventionally termed the second rotary clutch part, to bring the coacting clutch teeth into and out of interengagement, with pawl and ratchet or equivalent mechanism for initiating movement of the intermediate member in the direction to interengage the coacting clutch teeth upon the said passage in the rotary clutch parts through rotational synchronism in one direction of relative rotation.

It is well known to provide a clutch of the type referred to above with locking means which when the coacting clutch teeth are fully interengaged are capable of being selectively operated to lock the clutch in the engaged condition or to unlock the clutch so that it is unidirectionally free. A known form of locking means includes a control sleeve which is constrained for axial movement relative to the intermediate member and which is provided with a ring of locking dogs. The second rotary clutch part is provided with a ring of locking dogs, and in the disengaged condition of the clutch axial movement of the control sleeve in the direction for locking the clutch is prevented owing to the locking dogs of the control sleeve being baulked by the locking dogs of the second rotary clutch part. During engagement of the clutch, the associated helical movement of the intermediate member relative to the second rotary clutch part rotates the control sleeve relative to the second rotary clutch part such that when the clutch is in a fully engaged condition the locking dogs carried by the control sleeve are opposite the gaps between the locking dogs carried by the second rotary clutch part, and the control sleeve can be shifted axially relative to the intermediate member so as to interengage the locking dogs carried by the control sleeve with the locking dogs carried by the second rotary clutch part, thereby locking the clutch in the engaged condition.

In some applications of clutches of the type referred to above there arises a problem which will be explained with reference to the example of an electrical power generating set comprising a unidirectional gas turbine and a generator, with the clutch between them in an arrangement such that the clutch tends to engage when the shaft of the gas turbine tends to rotate in the forward direction relative to the shaft of the generator, i.e. the direction in which the turbine shaft rotates during normal operation of the set. In many gas turbine/generator sets a starter motor is provided at the generator end of the set, hence is order to start the gas turbine the clutch must first be engaged and then locked in engagement so as to enable torque to be transmitted from the starter motor via the generator shaft and clutch to the turbine shaft. The torque involved in starting the gas turbine is much smaller than the full torque that the clutch is capable of transmitting.

With the machinery at rest, engagement of the clutch prior to operation of the starter motor is effected by means of a turning gear which rotates the turbine shaft slowly in the forward direction. However, it may happen that the clutch does not engage fully, and cannot be locked. This may be the case for example when a dashpot is provided for cushioning the final engaging phase of the clutch, the resistance torque of the rotor of the generator within its bearings being insufficient to cause liquid to be displaced within the dashpot.

It would, therefore, be an advantage for the clutch to be capable of being locked when the coacting clutch teeth are only partially interengaged, and this could be catered for by providing extra wide gaps between the locking dogs of the control sleeve. However, under electrical fault conditions there may be very large fluctuations in the torque transmitted through the clutch, and with extra wide clearances between the interengaged locking dogs the rotary clutch parts are capable of relative rotary movements in both directions before the clearances are taken up, hence the torque fluctuations result in repeated flank engagement of the coacting locking dogs. When the coacting locking dogs are in flank engagement with the clutch teeth only partially interengaged the clutch teeth may, therefore, be severely overloaded.

It is normal practice for the control sleeve to be shifted to the unlocking position when the gas turbine has become self-sustaining, i.e. at approximately half full speed. However, there are advantages in keeping the control sleeve in the locking position during the time that the gas turbine is driving the generator, so that in the event of inadvertent disconnection of the generator from the grid under some electrical fault condition the turbine and the generator remain clutched together for quicker restarting of the turbine by means of the starter motor.

The object of the present invention is to enable the clutch to be locked in a partially engaged condition without the disadvantages attendant on known arrangements for this purpose as described above.

In accordance with the invention a clutch of the type referred to above is provided with locking means comprising coacting locking dogs, the locking means being capable of being brought to a locking condition when the coacting clutch teeth are in a predetermined condition of partial interengagement.

In the accompanying drawings,

FIGS. 1A to 4A are inwardly-directed circumferential section views of the coacting locking dogs in the relative positions that correspond respectively to FIGS. 1 to 4.

Figure 1:
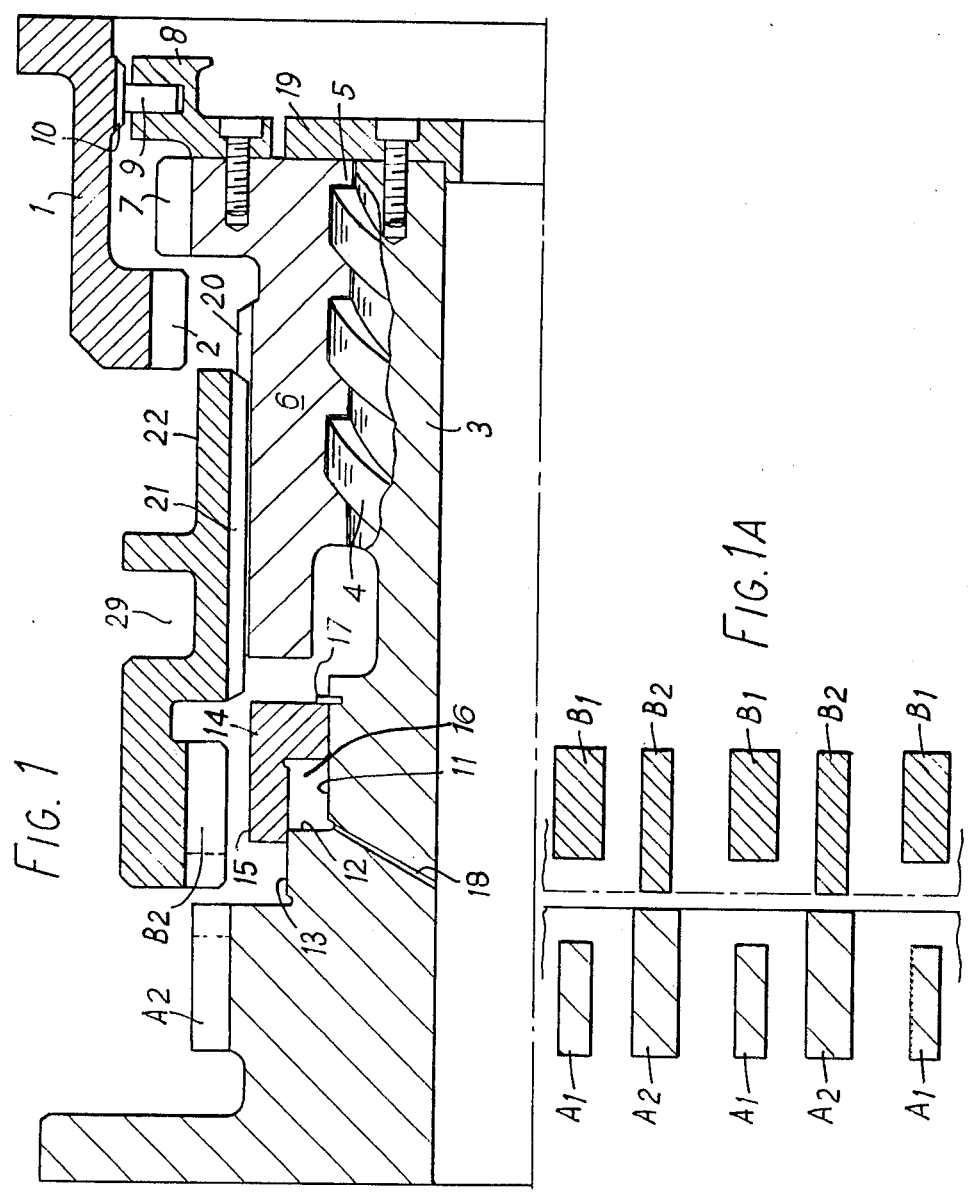
FIGS. 1 to 4 are half views in longitudinal sectional elevation of a synchronous self-shifting toothed clutch embodying the invention, showing the clutch in the "disengaged", "locking selected", "partially engaged and partially locked" and "fully engaged and fully locked" conditions respectively.
Figure 2:
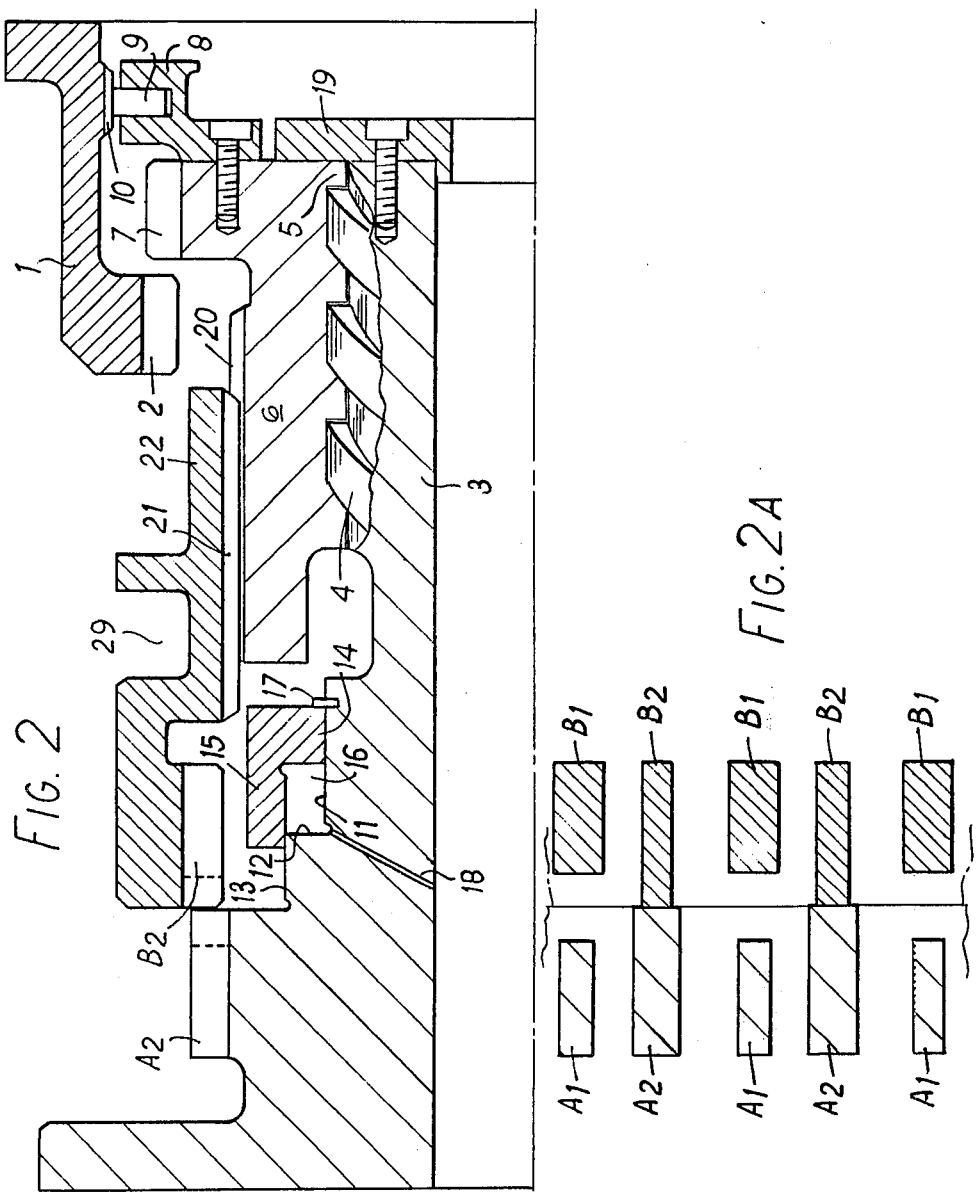

Referring to the drawings, the synchronous self-shifting toothed clutch illustrated includes a first rotary clutch part comprising a sleeve 1, which is formed with a ring of internal clutch teeth 2. A second rotary clutch part includes a sleeve 3, which is formed with external left-handed helical splines 4 with which are engaged internal helical splines 5 in an intermediate member comprising a sleeve 6. The intermediate member 6 is thereby constrained for helical movement relative to the second rotary clutch part 3. The intermediate member 6 carries a ring of external clutch teeth 7. A ring 8 bolted to the intermediate member 6 carries pawls, one of which is shown at 9, the noses of which point in counterclockwise direction as viewed from the left-hand end of the clutch as shown in FIGS. 1 to 4. The pawls 9 co-operate with a ring of internal ratchet teeth 10 carried by the first rotary clutch part 1. The second rotary clutch part 3 is formed with a shoulder comprising surfaces 11, 12 and 13, and a dashpot member comprising a ring 14 which is slidable axially on the surface 11 and a sleeve 15 which is slidable axially on the surface 13 co-operates with the shoulder to form an annular dashpot chamber 16. In the disengaged condition of the clutch (FIG. 1) the dashpot member 14, 15 is in a right-hand end position in which it is against a stop ring 17 carried by the second rotary clutch part 3. Oil is fed centrifugally to the dashpot chamber 16 through a supply duct 18.

As so far described, the construction and operation of the clutch conform to known practice. During relative rotation of the rotary clutch parts 1 and 3 in one direction the pawls 9 ratchet relative to the ratchet teeth 10. When the direction of relative rotation of the first and second rotary clutch parts 1 and 3 reverses, pawls 9 engage ratchet teeth 10, and the intermediate chamber 6 is shifted helically to the left relative to the second rotary clutch part 3, bringing the clutch teeth 7 into partial inter-engagement with the clutch teeth 2. During this movement of the intermediate member 6 it comes into engagement with the dashpot member 14, 15. The coaction of the partially interengaged clutch teeth 2 and 7 then causes the interemediate member 6 to be shifted further to the left, to bring the clutch teeth 7 into full interengagement with the clutch teeth 2. During this further movement of the intermediate member 6 the dashpot member 14, 15 is shifted to the left, thereby reducing the volume of the dashpot chamber 16 and expelling oil therefrom through the narrow supply duct 18, so that this movement of the intermediate member 6 is cushioned. The movement of the intermediate member 6 to the left is limited by the ring 14 of the dashpot member coming into engagement with the surface 12 of the second rotary clutch part 3. When the direction of relative rotation of the rotary clutch parts 1 and 3 again reverses, the interaction of the interengaged clutch teeth 2 and 7 causes the intermediate member 6 to be shifted to the right up to an axial stop ring 19 carried by the second rotary clutch part 3, thereby disengaging the clutch teeth 7 from the clutch teeth 2.

In accordance with the invention the clutch is provided with novel locking means which will now be described.

The intermediate member 6 is formed with straight external splines 20, with which are engaged internal straight splines 21 in a control sleeve 22. The second rotary clutch part 3 carries a ring of external locking dogs $A_1$ and $A_2$, and the control sleeve 22 carries a ring of internal locking dogs $B_1$ and $B_2$. The locking dogs carried by the second rotary clutch part 3 are alternately short and long, the locking dogs $A_1$ being shorter than the locking dogs $A_2$, as shown in FIGS. 1A to 4A. The short dogs $A_1$ are of smaller width than the long dogs $A_2$, and the gaps between the dogs $A_1$ and $A_2$ are alternately wide and narrow. The locking dogs carried by the control sleeve 22 are also alternately short and long, the locking dogs $B_1$ being shorter than the locking dogs $B_2$. The long dogs $B_2$ are of smaller width than the short dogs $B_1$, as shown in FIGS. 1A to 4A, and the gaps between the dogs $B_1$ and $B_2$ are alternately wide and narrow. As can be seen from FIG. 1A, with the clutch in the disengaged condition the locking dogs $A_1$ and $A_2$ carried by the second rotary clutch part 3 are to the left of the locking dogs $B_1$ and $B_2$ carried by the control sleeve 22. The long dogs $A_2$ project to the right beyond the short dogs $A_1$, and the long dogs $B_2$ project to the left beyond the short dogs $B_1$.

Figure 5:
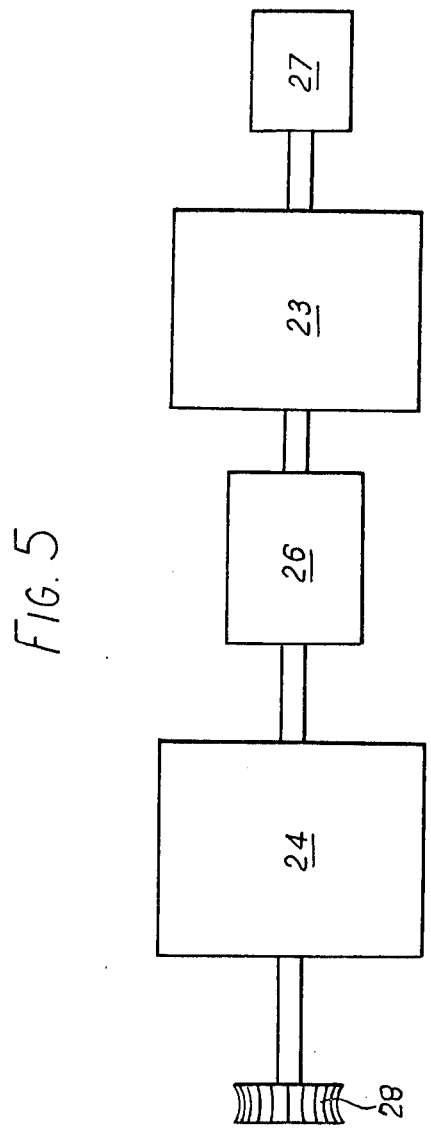
FIG. 5 is a diagrammatic view of a gas turbine/generator set incorporating a clutch in accordance with the invention.

In the following description of the operation of the clutch it will be assumed that as shown in FIG. 5 the first rotary clutch part 1 is drivably connected to an a.c. generator 23 and the second rotary clutch part 3 is drivably connected to a gas turbine 24, the clutch being shown at 26, a starter motor being shown at 27 and the output part of a turning gear being shown at 28.

Figure 3:
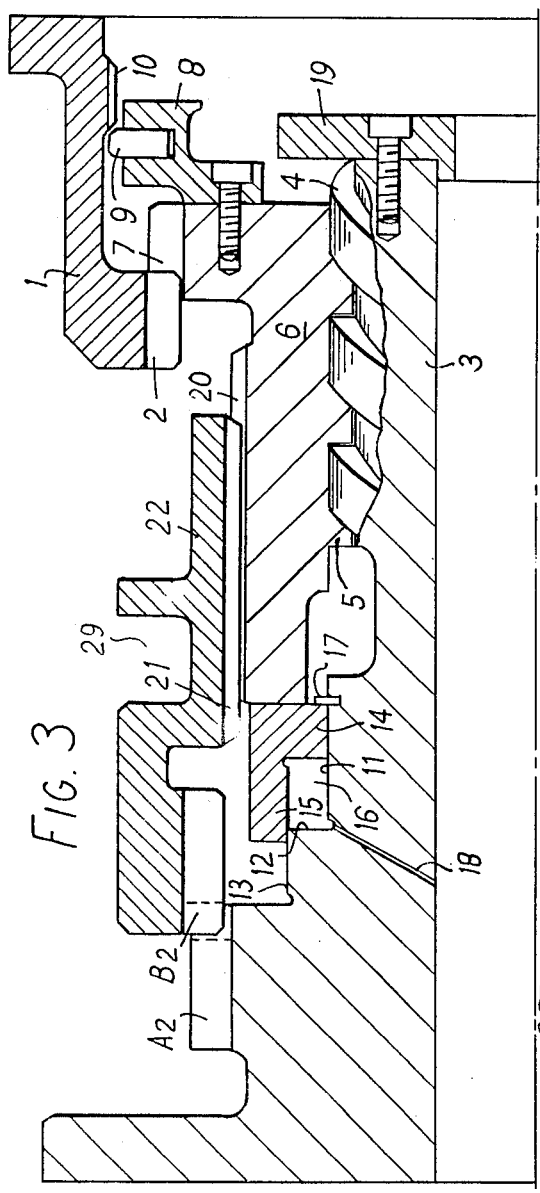
Figure 3A:
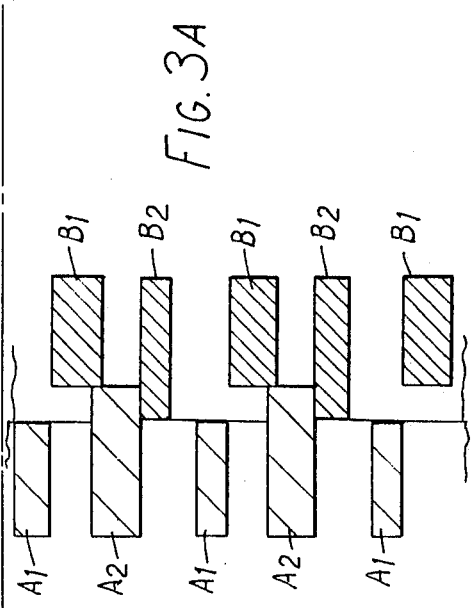

With the machinery at rest, the clutch is in the disengaged and unlocked condition shown in FIGS. 1 and 1A with the locking dogs $B_1$ and $B_2$ fully disengaged axially from the locking dogs $A_1$ and $A_2$. When the machinery is to be started, a control fork (not shown) engaged in an annular groove 29 in the control sleeve 10 is actuated by a servo motor (not shown) so as to urge the control sleeve 22 to the left. The control sleeve 22 takes up the position shown in FIGS. 2 and 2A, with the long locking dogs $B_2$ axially abutting the long locking dogs $A_2$. The shaft of the gas turbine 24 is then rotated slowly in the forward direction by means of the turning gear 28, thereby rotating the second rotary clutch part 3 in counterclockwise direction as seen from the left-hand end of FIG. 2, relative to the first rotary clutch part 1, whereby the clutch is caused to assume a condition of partial interengagement of the clutch teeth 2 and 7, as shown in FIG. 3, further movement of the intermediate member 6 to the left being prevented owing to the very low torque resistance of the rotor of the generator 23 in its bearings being insufficient to displace oil from the dashpot chamber 16. During the movement of the intermediate member 6 to the position shown in FIG. 3, its helical movement relative to the second rotary clutch part 3 rotates the control sleeve 22 through a small angle relative to the second rotary clutch part 3, such as is sufficient to bring the long dogs $B_2$ opposite the gaps between the locking dogs $A_1$ and $A_2$, and the control sleeve 22 can now shift under the action of the servo motor and control fork to bring the projecting ends of its long and narrow locking dogs $B_2$ into the wider spaces between the locking dogs $A_1$ and $A_2$, further movement of the control sleeve 22 to the left being prevented owing to the wide and short locking dogs $B_1$ being in end abutment with the long and wide locking dogs $A_2$, as shown in FIG. 3A. As shown in FIG. 3, the movement of the intermediate member 6 has brought the intermediate member 6 into end abutment with the dashpot member 14, 15.

The effect of the partial interengagement of the locking dogs $B_2$ with the locking dogs $A_1$ and $A_2$ is that when the starter motor 27 coupled to the rotor of the generator 23 is energized the clutch 26 remains in partial engagement so that torque is transmitted from the starter motor 27 through the clutch 26 to the shaft of the gas turbine 24. When the gas turbine 24 becomes self-sustaining such that the torque through the clutch 26 reverses, the clutch shifts into full engagement, with helical movement of the intermediate member 6 relative to the second rotary clutch part 3, this helical movement causing a rotational movement of the control sleeve 22 relative to the second rotary clutch part 3 such that all the locking dogs B₁ and B₂ can enter gaps of appropriate width between the locking dogs A₁ and A₂, whereby the clutch is locked in full engagement as shown in FIGS. 4 and 4A.

Figure 4:
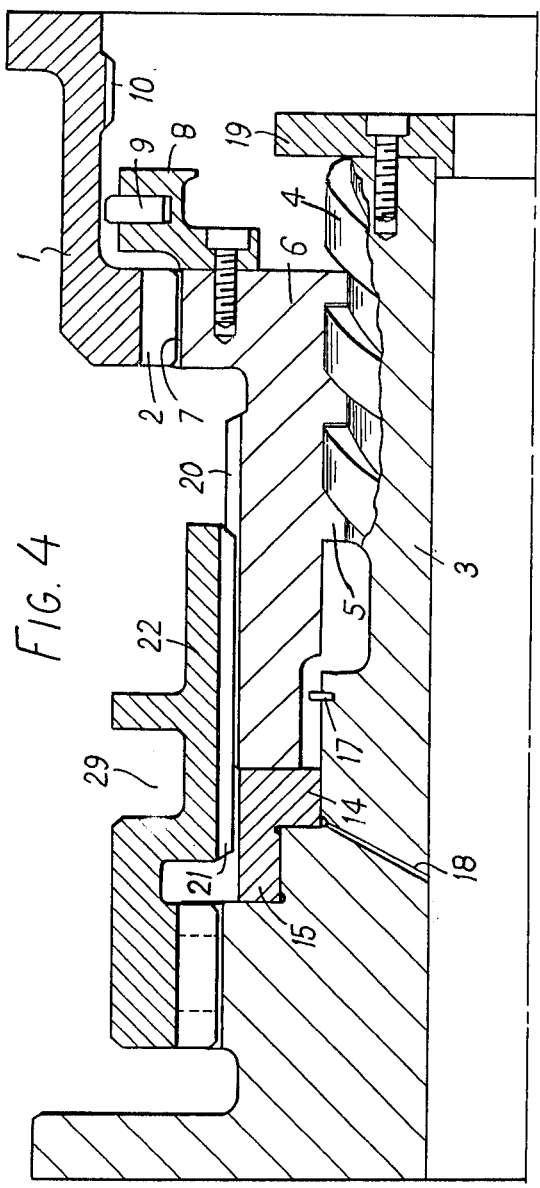
Figure 4A:
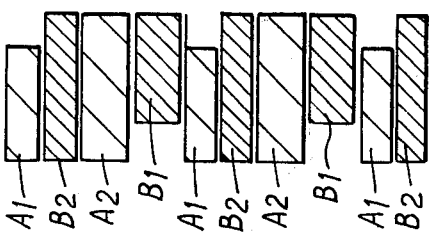

The movement of the control sleeve from the locking position of FIGS. 3 and 3A to the locking position of FIGS. 4 and 4A indicates that the torque through the clutch has changed from negative to positive, i.e. that the gas turbine is self-sustaining, and this movement of the control sleeve 22 may be used to operate a switch to de-energize the stater motor.

The movement of the control sleeve 22 from the unlocked position of FIGS. 1 and 1A to the locking position of FIGS. 3 and 3A may be utilized to effect another operation, or to indicate that such other operation may be performed. Such other operation may for example be the engagement of another clutch.

We claim:

1. A synchronous self-shifting toothed clutch of the type comprising first and second rotary clutch parts, coacting sets of clutch teeth and mechanism operative, upon passage of said first and second rotary clutch parts through synchronism in one direction of relative rotation, to initiate engagement of the clutch, and having means operable, when the said coacting clutch teeth are fully interengaged, to lock the clutch in the fully engaged condition, the improvement comprising means selectively operable, when the coacting clutch teeth are in a predetermined partially interengaged condition, to lock the clutch against disengagement from the partially engaged condition.

2. A synchronous self-shifting toothed clutch according to claim 1, wherein said last-named means comprise a control sleeve, a first ring of locking dogs carried by said control sleeve, a second ring of locking dogs carried by another part of the clutch, and means mounting said control sleeve such that when the coacting clutch teeth are in said predetermined partially interengaged condition, said control sleeve can be shifted to bring some of the locking dogs of said first ring into interengagement with some of the locking dogs of said second ring whereby to lock the clutch against disengagement from the partially engaged condition, and such that when the coacting clutch teeth are fully interengaged said control sleeve can be shifted to bring all the dogs of said first ring into interengagement with all the dogs of said second ring whereby to lock the clutch in the fully engaged condition.

3. A synchronous self-shifting toothed clutch according to claim 1, including an intermediate member, means constraining said intermediate member for helical movement relative to one of said first and second rotary clutch parts, a control sleeve, a first ring of locking dogs carried by said control sleeve, a second ring of locking dogs carried by one of said first and second rotary clutch parts, the locking dogs of one of said rings being alternately short and long, the short dogs being narrower than the long dogs, the locking dogs of the other of said rings being alternately short and long, the short dogs being wider than the long dogs, with the long dogs of each ring projecting beyond the short dogs towards the dogs of the other ring, and the spaces between the dogs of each ring being alternately wide and narrow, and means mounting said control sleeve so that it is rotatable with and axially movable relative to said intermediate member, the mutual arrangement of said dogs and the spaces therebetween being such that in the disengaged condition of the clutch the long dogs of each ring are in baulking relationship with the long dogs of the other ring, and in the condition of partial interengagement of the coacting clutch teeth the long dogs of one ring can be interengaged with the long dogs of the other ring by shifting said control sleeve but the short dogs of one ring are baulked by the long dogs of the other ring, whereas in the condition of full interengagement of the coacting clutch teeth the short and long dogs of each ring can enter the spaces of corresponding width between the dogs of the other ring so that said control sleeve can be shifted to lock the clutch in the fully engaged condition.

* * * * *

UNITED STATES PATENT AND TRADEMARK OFFICE
CERTIFICATE OF CORRECTION

PATENT NO. : 4,069,903
DATED : January 24, 1978
INVENTOR(S) : Herbert A. Clements et al It is certified that error appears in the above-identified patent and that said Letters Patent are hereby corrected as shown below:

Col. 1, line 12, "of" should be --or--;

" line 19, "in" should be --of--.

Col. 3, line 26, "chamber 6" should be --member 6--;

" line 33, "interemediate" should be --intermediate--.

Signed and Sealed this

Fourth Day of July 1978

[SEAL]

Attest:

RUTH C. MASON
Attesting Officer

DONALD W. BANNER
Commissioner of Patents and Trademarks